(12) United States Patent
Haraguchi et al.

(10) Patent No.: US 11,505,480 B2
(45) Date of Patent: *Nov. 22, 2022

(54) METHOD OF TREATING WASTEWATER (71) Applicant: MITSUBISHI MATERIALS CORPORATION, Tokyo (JP)

(72) Inventors: Daisuke Haraguchi, Iwaki (JP); Hiroshi Hayashi, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 16/957,485

(22) PCT Filed: Dec. 27, 2018

(86) PCT No.: PCT/JP2018/048041
§ 371 (c)(1),
(2) Date: Jun. 24, 2020

(87) PCT Pub. No.: WO2019/131832
PCT Pub. Date: Jul. 4, 2019

(65) Prior Publication Data
US 2021/0070637 A1    Mar. 11, 2021

(30) Foreign Application Priority Data

Dec. 27, 2017 (JP) .............................. JP2017-250885

(51) Int. Cl.
*C02F 1/52* (2006.01)
*C01F 11/46* (2006.01)
(Continued)

(52) U.S. Cl.
CPC .......... *C02F 1/5245* (2013.01); *C01F 11/468* (2013.01); *C02F 1/583* (2013.01);
(Continued)

(58) Field of Classification Search
None
See application file for complete search history.

(56) References Cited

U.S. PATENT DOCUMENTS 5,651,895 A     7/1997   Gordon
5,976,383 A    11/1999   Guess et al.
(Continued)

FOREIGN PATENT DOCUMENTS

CL    200800232 A    1/2008
CL    201402564 A    9/2014
(Continued)

OTHER PUBLICATIONS

Machine translation of JP2017047336A, pp. 1-14. (Year: 2017).*
(Continued)

*Primary Examiner* — Clare M Perrin
(74) *Attorney, Agent, or Firm* — Locke Lord LLP (57) ABSTRACT

A method of treating a waste liquid includes: an aluminum dissolution step of dissolving aluminum in an acidic waste liquid and performing separation into a first treated water and a reduced heavy metal precipitate; a gypsum recovery step of adding a calcium compound to the first treated water at a liquid property of a pH of 4 or less, and performing separation into a second treated water and gypsum; an aluminum and fluorine removal step of adding an alkali to the second treated water and performing separation into a third treated water and a precipitate containing aluminum and fluorine; and a neutralization step of adding an alkali to the third treated water and performing separation into an alkali neutralization treated water and a neutralized precipitate of a heavy metal hydroxide.

4 Claims, 2 Drawing Sheets

(51) Int. Cl.
*C02F 1/68* (2006.01)
*C02F 1/70* (2006.01)
*C22B 3/46* (2006.01)
*C02F 1/66* (2006.01)
*C02F 1/58* (2006.01)
*C02F 101/14* (2006.01)
*C02F 101/20* (2006.01)
*C02F 103/16* (2006.01)

(52) U.S. Cl.
CPC ............ *C02F 1/66* (2013.01); *C02F 1/683* (2013.01); *C02F 1/70* (2013.01); *C22B 3/46* (2013.01); *C02F 2101/14* (2013.01); *C02F 2101/20* (2013.01); *C02F 2103/16* (2013.01); *C02F 2209/06* (2013.01)

(56) References Cited

U.S. PATENT DOCUMENTS

| | | | |
|---|---|---|---|
| 2017/0036936 | A1 | 2/2017 | Paxton |
| 2019/0276342 | A1* | 9/2019 | Izawa ...................... C02F 1/62 |

FOREIGN PATENT DOCUMENTS

| | | | | |
|---|---|---|---|---|
| CL | 201500392 | A | 2/2015 | |
| CL | 201501976 | A | 7/2015 | |
| CN | 101830583 | A | 9/2010 | |
| CN | 102001762 | B | 3/2014 | |
| CN | 105366853 | A | 3/2016 | |
| JP | 59-034644 | B2 | 8/1984 | |
| JP | S60-228627 | A | 11/1985 | |
| JP | 62-197192 | A | 8/1987 | |
| JP | H08-134664 | A | 5/1996 | |
| JP | 09-192675 | A | 7/1997 | |
| JP | 2000-117265 | A | 4/2000 | |
| JP | 2005-270860 | A | 10/2005 | |
| JP | 2007-196177 | A | 8/2007 | |
| JP | 2011-050809 | A | 3/2011 | |
| JP | 2013-075260 | A | 4/2013 | |
| JP | 2016-191119 | A | 11/2016 | |
| JP | 2017-047336 | A | 3/2017 | |
| JP | 2017047336 | A | * 3/2017 | |
| JP | 2017-105651 | A | 6/2017 | |
| JP | 2017-159222 | A | 9/2017 | |
| JP | 6206287 | B2 | 10/2017 | |
| JP | 2018-079439 | A | 5/2018 | |
| KR | 101656825 | B1 | 9/2016 | |
| WO | 98/51616 | A1 | 11/1998 | |
| WO | 03/000602 | A1 | 1/2003 | |
| WO | 2008/004488 | A1 | 1/2008 | |
| WO | WO-2018092396 | A1 | * 5/2018 | ............ C02F 1/5236 |

OTHER PUBLICATIONS

International Search Report dated Mar. 26, 2019, issued for PCT/JP2018/048041 and English translation thereof.
Supplementary European Search Report dated Aug. 13, 2021, issued for European Patent Application No. 18896143.7.
Office Action dated May 19, 2021, issued for CL2020-01736 and English translation thereof.
Office Action dated Nov. 30, 2021, issued for Chinese Patent Application No. 201880084140.8 and an English translation thereof.
Office Action dated May 10, 2022, issued for European Patent Application No. 18896143.7.
International Search Report dated Mar. 26, 2019, issued for PCT/JP2018/048026 and English translation thereof.
Office Action dated May 19, 2021, issued for CL Patent Application No. 2020-01731 and English translation thereof.
Supplementary European Search Report dated Aug. 13, 2021, issued for European Patent Application No. 18894256.9.
Notice of Allowance issued in corresponding Chinese Patent Application No. CN 201880084084.8, dated Jan. 10, 2022.
Office Action issued in European Patent Application No. EP 18894256.9, dated May 10, 2022.
Office Action dated Oct. 5, 2021, issued for U.S. Appl. No. 16/957,464.

* cited by examiner

METHOD OF TREATING WASTEWATER

CROSS REFERENCE TO RELATED APPLICATIONS

This application is related to co-pending application: "METHOD OF TREATING WASTEWATER" filed even date herewith in the names of Daisuke HARAGUCHI and Hiroshi HAYASHI as a national phase entry of PCT/JP2018/048026, which application is assigned to the assignee of the present application and is incorporated by reference herein.

TECHNICAL FIELD

The present invention relates to a method of treating wastewater in which gypsum having a small amount of fluorine is recovered from acidic wastewater containing heavy metals such as copper, arsenic, and zinc in addition to sulfuric acid, fluorine, and chlorine, like wastewater from a non-ferrous metal smelter, and the heavy metals are sufficiently removed from the residual liquid at a low cost.

Priority is claimed on Japanese Patent Application No. 2017-250885, filed Dec. 27, 2017, the content of which is incorporated herein by reference.

BACKGROUND ART

Wastewater from a non-ferrous metal smelter contains a large amount of heavy metals such as copper, arsenic, and zinc in addition to sulfuric acid, fluorine, and chlorine, and in order to discharge this wastewater to the outside of the system, these heavy metals need to be sufficiently removed to comply with wastewater regulations. Since the wastewater is generally a strongly acidic wastewater containing sulfate ions, a neutralization treatment is often performed by adding a calcium compound to the wastewater, and recovery and reuse of gypsum produced by this neutralization treatment has been expected.

The following methods are known as a method of treating wastewater from a non-ferrous metal smelter or the like.

(a) A method of treating waste acid including: a primary sulfidation step of mixing waste acid generated in copper smelting with a sulfidizing agent to sulfidize a heavy metal and separating the obtained sulfide precipitates into a primary slurry and a primary clear liquid; a gypsum manufacturing step of mixing the primary clear liquid with a neutralizing agent to form gypsum with sulfuric acid and performing solid-liquid separation to obtain a final gypsum liquid; and a secondary sulfidation step of mixing the final gypsum liquid with a sulfidizing agent to sulfidize the heavy metal and performing separation into a secondary slurry containing the obtained sulfide precipitates and a secondary clear liquid, in which the secondary slurry from which the secondary clear liquid is separated in the secondary sulfidation step is returned to the primary sulfidation step and mixed with the waste acid (Patent Document 1).

(b) A method of manufacturing waste acid gypsum in which an alkaline agent containing Ca is added to waste acid obtained from exhaust gas generated in non-ferrous metal smelting to neutralize the waste acid, and fluorine contained in gypsum produced by the neutralization treatment is washed with water or sulfuric acid (Patent Document 2).

(c) A method of treating waste sulfuric acid in which aluminum in an amount 0.5 or more times the amount of fluorine contained in waste sulfuric acid is added to the waste sulfuric acid containing fluorine and thereafter the resultant is neutralized to a pH of 5.6 or less with an alkaline agent Patent Document 3).

(d) A method of treating wastewater in which an aluminum salt is added to wastewater containing any one or more of fluorine, selenium, and compounds thereof to form aggregated flocs, the resultant is then subjected to precipitation separation, a liquid chelating agent is added to the separated supernatant water for a reaction, an aluminum salt is added to the reaction liquid to aggregate solids, and the resultant is subjected to solid-liquid separation (Patent Document 4).

CITATION LIST

Patent Document

[Patent Document 1]
  Japanese Patent No. 6206287
[Patent Document 2]
  Japanese Unexamined Patent Application, First Publication No. 2017-105651
[Patent Document 3]
  Japanese Examined Patent Application, Second Publication No. S59-34644
[Patent Document 4]
  Japanese Unexamined Patent Application, First Publication No. H9-192675

SUMMARY OF INVENTION

Technical Problem

In the treatment method of Patent Document 1, dissolved heavy metals are precipitated and removed as sulfides by the sulfidizing agent. However, when the sulfidizing agent is added to a strongly acidic solution such as wastewater from a non-ferrous metal smelter, it is dangerous because harmful hydrogen sulfide gas is generated, and there is a safety problem. Moreover, the sulfidizing agent corresponding to the volatilized hydrogen sulfide does not contribute to the precipitation removal of the heavy metal, so that the reaction efficiency is low. Furthermore, although the gypsum is manufactured in the primary sulfidation step in this treatment method, fluorine in wastewater is not removed by this sulfidation treatment, and a large amount of fluorine is mixed in the gypsum.

The treatment method of Patent Document 2 is a method of washing gypsum in which fluorine is mixed with water or sulfuric acid, but in this example, 50 mL of a washing liquid is required for 10 g of gypsum, and the washing liquid is discharged as a large amount of wastewater. This increase in wastewater is both environmentally and economically disadvantageous. In addition, since gypsum having a large amount of fluorine is washed, in the case of washing out, stirring, insufficient washing, and the like, fluorine is not sufficiently reduced from the gypsum. In order to stabilize the washing, it is necessary to increase the addition amount of a solution to the gypsum and lower the solid content concentration. However, in this case, the amount of the washing liquid and wastewater also increases, and a wastewater treatment for the new washing water containing fluorine is necessary.

In the treatment method of Patent Document 3, aluminum is added to the waste sulfuric acid containing fluorine to keep fluorine in the liquid, and the calcium compound is added thereto to generate gypsum, followed by solid-liquid separation. However, since a large amount of aluminum, fluorine, and heavy metals are dissolved in the filtrate from which the gypsum is separated, treatment of aluminum, fluorine, and heavy metals in the liquid becomes a problem.

The treatment method of Patent Document 4 is a method in which the aluminum salt is added to the wastewater to adjust the pH to 6 to 8 so as to precipitate aluminum hydroxide, gypsum and calcium fluoride ($CaF_2$), which are SS components (suspended solids) in the wastewater, are mixed in the aluminum hydroxide flocs, and a portion of fluoride ions are adsorbed onto the aluminum hydroxide to be removed. However, since the precipitates are the mixture of the gypsum and fluorine-containing precipitates, it is difficult to effectively use the precipitates as a resource. Furthermore, copper and arsenic contained in the waste liquid cannot be sufficiently removed.

The present invention solves the above problems in the treatment methods in the related art, and provides a treatment method excellent in an effect of removing fluorine and heavy metals contained in a waste liquid.

Solution to Problem

The present invention is a method of treating a waste liquid, which solves the above problems by the following configurations.

[1] A method of treating a waste liquid for recovering gypsum having a small amount of fluorine from an acidic waste liquid containing fluorine and a heavy metal and removing the heavy metal, the method including: an aluminum dissolution step of dissolving aluminum in the acidic waste liquid to stably dissolve fluorine in the liquid as a fluoroaluminate ion and produce a reduced heavy metal precipitate and performing separation into a first treated water and the reduced heavy metal precipitate; a gypsum recovery step of, after removing the reduced heavy metal precipitate, adding a calcium compound to the first treated water at a liquid property of a pH of 4 or less to produce gypsum, and performing separation into a second treated water and the gypsum; an aluminum and fluorine removal step of, after removing the gypsum, adding an alkali to the second treated water to adjust a pH to 5.5 to 9.5 and produce a precipitate containing aluminum and fluorine while suppressing the amount of the precipitate, and performing separation into a third treated water and the precipitate containing aluminum and fluorine; and a neutralization step of, after removing the precipitate containing aluminum and fluorine, further adding an alkali to the third treated water to adjust the pH to 9.5 to 11.8 and produce a neutralized precipitate of a heavy metal hydroxide, and performing separation into an alkali neutralization treated water and the neutralized precipitate of a heavy metal hydroxide.

[2] The method of treating a waste liquid according to [1], in which, in the aluminum and fluorine removal step, a liquid property of the second treated water is adjusted to a pH of 5.5 to 7.0 to suppress the amount of the precipitate and suppress precipitation of arsenic and zinc, thereby fluorine and aluminum are precipitated.

[3] The method of treating a waste liquid according to [1] or [2], in which the acidic waste liquid containing fluorine and a heavy metal is wastewater from a non-ferrous metal smelter.

Advantageous Effects of Invention

According to the method of treating a waste liquid of the present invention, it is possible to provide a method of treating a waste liquid capable of more effectively removing fluorine and heavy metals contained in a waste liquid.

DESCRIPTION OF EMBODIMENTS

Hereinafter, an example of embodiments of the present invention will be described in detail with reference to the drawings, but the present invention should not be construed as being limited to these embodiments.

A method of treating a waste liquid of the present embodiment is a method of treating a waste liquid for recovering gypsum having a small amount of fluorine from an acidic waste liquid containing fluorine and heavy metals and removing the heavy metals, the method including: an aluminum dissolution step of dissolving metal aluminum in the acidic waste liquid to stably dissolve fluorine in the liquid as a fluoroaluminate ion and produce reduced heavy metal precipitates and performing separation into a first treated water and the reduced heavy metal precipitates; a gypsum recovery step of, after removing the reduced heavy metal precipitates, adding a calcium compound to the first treated water at a liquid property of a pH of 4 or less to produce gypsum, and performing separation into a second treated water and the gypsum; an aluminum and fluorine removal step of, after removing the gypsum, adding an alkali to the second treated water to adjust a pH to 5.5 to 9.5 and produce precipitates containing aluminum and fluorine while suppressing the amount of the precipitates, and performing separation into a third treated water and the precipitates containing aluminum and fluorine; and a neutralization step of, after removing the precipitates containing aluminum and fluorine, further adding an alkali to the third treated water to adjust the pH to 9.5 to 11.8 and produce neutralized precipitates of heavy metal hydroxides, and performing separation into an alkali neutralization treated water and the neutralized precipitates of heavy metal hydroxides.

Figure 1:
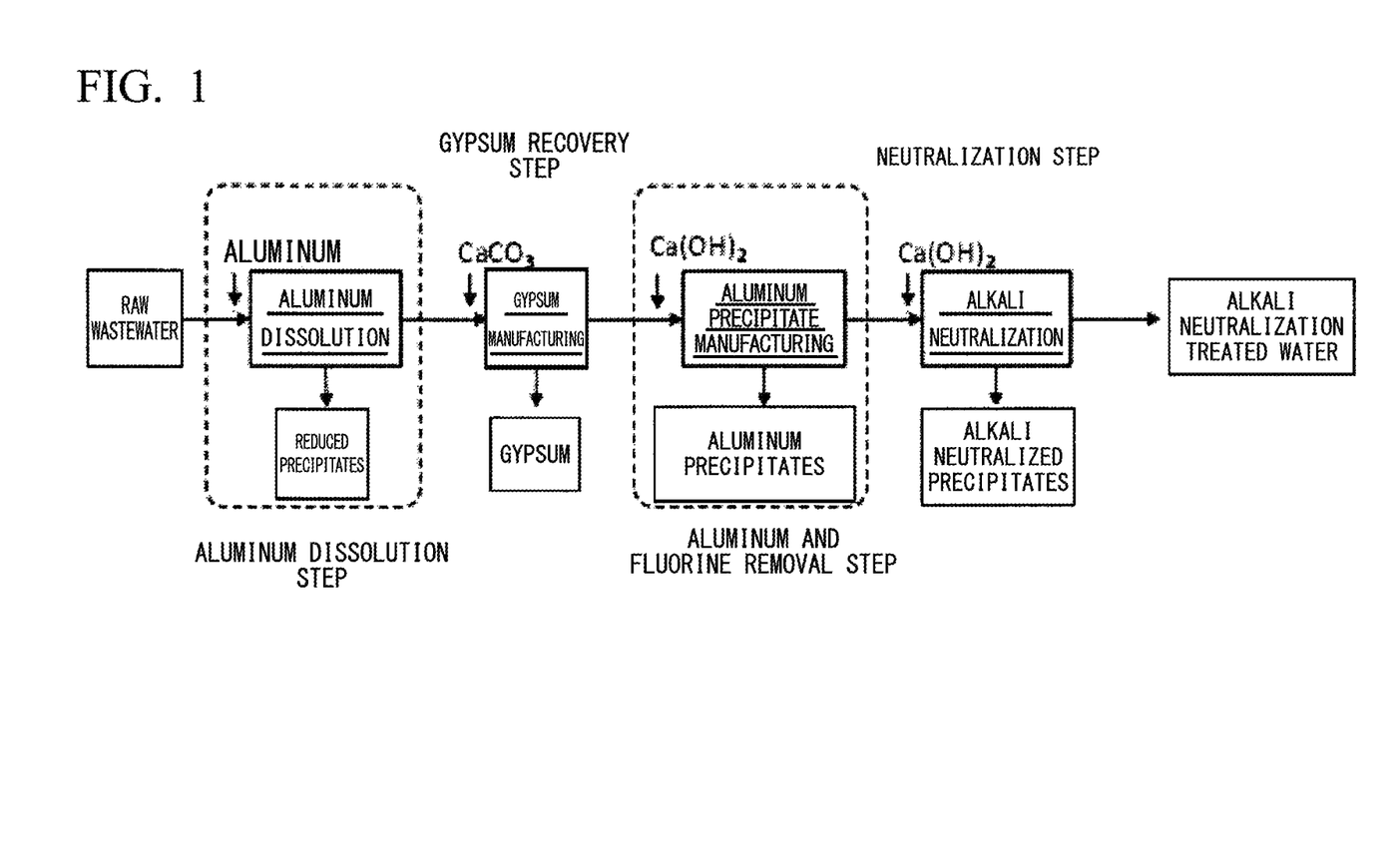
FIG. 1 is a process diagram showing an outline of a method of treating a waste liquid of the present invention.

The outline of the method of treating a waste liquid of the present embodiment is shown in the step diagram of FIG. 1.

The acidic waste liquid containing fluorine and heavy metals, which is the object to be treated of the present embodiment, is wastewater generated in a step of smelting non-ferrous metal sulfide minerals, such as copper smelting. In general, wastewater from a non-ferrous metal smelter is strongly acidic wastewater having a pH of 0.8 to 2.0, which contains heavy metals such as copper, arsenic, and zinc, and further contains sulfuric acid and fluorine.

[Aluminum Dissolution Step]

The method of treating a waste liquid of the present embodiment includes an aluminum dissolution step of dissolving aluminum in the acidic waste liquid containing fluorine and heavy metals to stably dissolve fluorine in the liquid as fluoroaluminate ions and produce reduced heavy metal precipitates and performing solid-liquid separation into a first treated water and the reduced heavy metal precipitates.

By dissolving aluminum, aluminum ions ($Al^{3+}$) are supplied into the liquid, and the aluminum ions are complexed with fluoride ions ($F^-$) in the liquid as shown in Formulae (1) to (3) below to form fluoroaluminate ions ($AlF^{2+}$, $AlF_2^+$, $AlF_3^0$), so that fluorine can be stably dissolved in the liquid.

$$Al^{3+}(aq) + F^-(aq) \rightarrow AlF^{2+}(aq) \qquad (1)$$

$$AlF^{2+}(aq) + F^-(aq) \rightarrow AlF_2^+(aq) \qquad (2)$$

$$AlF_2^+(aq) + F^-(aq) \rightarrow AlF_3^0(aq) \qquad (3)$$

Since the fluoride ions in the liquid form the fluoroaluminate ions with the aluminum ions and are stably dissolved, the production of calcium fluoride ($CaF_2$) is suppressed even if the calcium compound is added in the subsequent step, and mixing of calcium fluoride in the produced gypsum can be avoided. Accordingly, gypsum with a small amount of fluorine can be obtained.

Furthermore, when aluminum is dissolved, a reduction reaction occurs as shown in Formulae (4) and (5) below. For example, since aluminum has a greater ionization tendency than copper, copper ions ($Cu^{2+}$) in the liquid are reduced and precipitated by the dissolution of aluminum, or the reduced copper reacts with arsenite ions ($AsO_3^{3-}$) to cause precipitation of copper arsenide. Since the ionization tendency of zinc is close to that of aluminum, most of zinc remains dissolved in the liquid.

$$2Al(s) + 3Cu^{2+}(aq) \rightarrow 2Al^{3+}(aq) + 3Cu(s) \qquad (4)$$

$$Al(s) + 3Cu(s) + AsO_3^{3-}(aq) + 6H^+ \rightarrow Al^{3+}(aq) + Cu_3As(s) + 6H_2O \qquad (5)$$

The amount of aluminum dissolved is preferably in a range of Al/F=0.4 or more and 0.8 or less in molar ratio with respect to the amount of fluorine in the liquid. When the amount of aluminum dissolved is Al/F=0.3 mol, complex ionization of fluorine is insufficient, the amount of fluorine in gypsum increases when gypsum is produced. When Al/F=0.4 mol or more, the amount of fluorine in gypsum can be significantly reduced.

Specifically, as shown in Example 1, when Al/F=0.3 mol, the amount of fluorine in gypsum is 0.3 mass % or more. On the other hand, when Al/F=0.4 mol, the amount of fluorine in gypsum can be 0.2 mass % or less.

The liquid property of the acidic waste liquid in the aluminum dissolution step is preferably a pH of 4.0 or less. As shown in Example 1, when the pH is 4.1 or more, arsenic in the liquid is adsorbed onto gypsum and the arsenic content rapidly increases, which is not preferable.

As described above, by dissolving aluminum in the acidic waste liquid to cause a reduction reaction, copper or arsenic in the liquid can be precipitated as reduced precipitates, and can be removed by solid-liquid separation. This reduction reaction proceeds favorably if the oxidation-reduction potential is +400 mV (vs. SHE) or less.

In addition, in a case where suspended particles containing fine heavy metals and the like are present in the acidic waste liquid, these suspended particles can be incorporated into the reduced precipitates and aggregated and separated. By removing the heavy metals in the early stage of the treatment step, it is possible to prevent the heavy metals from being mixed in the precipitates in the latter stage and to reduce the addition amount of a neutralizing agent in the treatment in the latter stage compared to the process in the related art. Since the primary component of the reduced precipitates is copper or copper arsenide, this can be recovered and used as a raw material for copper smelting.

[Gypsum Recovery Step]

A calcium compound is added to the filtrate (first treated water) obtained by solid-liquid separation of the reduced precipitates produced by dissolving aluminum, so as to produce gypsum as shown in Formula (6), and solid-liquid separation into a second treated water and gypsum is performed to recover the gypsum. By the production of the gypsum, sulfate ions in the liquid are removed. As the calcium compound, calcium carbonate, calcium hydroxide, calcium oxide, or limes containing these as primary components can be used.

$$H_2SO_4(aq) + CaCO_3(s) + H_2O \rightarrow CaSO_4 \cdot 2H_2O(s) + CO_2(g) \qquad (6)$$

Since fluoride ions contained in the filtrate form complex ions with aluminum ions and are stably dissolved, it is difficult for calcium fluoride ($CaF_2$) to be produced even if calcium carbonate or the like is added, and mixing of fluorine in gypsum can be avoided. Accordingly, gypsum with a low fluorine content can be obtained. In addition, even if suspended particles containing fine heavy metals and the like are present in the wastewater, the suspended particles are aggregated and separated in the previous step, so that gypsum having a low heavy metal content can be recovered. The production of gypsum is preferably performed at a pH of 4.0 or less. When the pH exceeds 4.0, heavy metals are precipitated as hydroxides or coprecipitated in gypsum, which is not preferable.

[Aluminum and Fluorine Removal Step]

Most of the sulfate ions are removed from the residual liquid (second treated water) after the gypsum is recovered, but dissolved aluminum, fluorine contained in the wastewater from the beginning, and heavy metals are dissolved therein. In the related art, as a method of removing heavy metals from such a liquid, it is known that a neutralizing agent such as calcium hydroxide is added to cause a liquid property to be an alkaline range of a pH of 9.5 to a pH of 11.8 and produce precipitates of heavy metal hydroxides. However, when the liquid property is adjusted to a pH range of 9.5 to 11.8 in a single step by adding the neutralizing agent, in addition to the production of the heavy metal hydroxides, as shown in Formulae (7) to (9) below, layered double hydroxides such as Friedel's salt ($Ca_2Al(OH)_6Cl \cdot 2H_2O$), Kuzel's salt ($Ca_4Al_2(OH)_{12}Cl(SO_4) \cdot 5H_2O$), and Ettringite ($Ca_6Al_2(OH)_{12}(SO_4)_3 \cdot 26H_2O$) are produced, and precipitates containing a large amount of chlorine, hydroxyl groups, and water of hydration in addition to aluminum are produced, thereby increasing the amount of sludge produced.

$$2Ca(OH)_2 + Al^{3+} + 2OH^- + Cl^- + 2H_2O \rightarrow Ca_2Al(OH)_6Cl \cdot 2H_2O \qquad (7)$$

$$4Ca(OH)_2 + 2Al^{3+} + 4OH^- + Cl^- + SO_4^{2-} + 5H_2O \rightarrow Ca_4Al_2(OH)_{12}Cl(SO_4) \cdot 5H_2O \qquad (8)$$

$$6Ca(OH)_2 + 2Al^{3+} + Cl^- + 3SO_4^{2-} + 26H_2O \rightarrow Ca_6Al_2(OH)_{12}(SO_4)_3 \cdot 26H_2O \qquad (9)$$

Wastewater treatment sludge is generally repeatedly treated in the smelting process or landfilled at a final disposal site. When a large amount of wastewater treatment sludge with a high water content is input, the amount of fuel used in the smelting process increases, and the amount of landfill increases in the landfill disposal, which causes insufficiency of the final disposal site. Therefore, the increase in the amount of sludge produced needs to be avoided.

In the treatment method of the present embodiment, in order to suppress the production of layered double hydroxides and avoid an increase in the amount of sludge produced, the liquid property of the second treated water is not adjusted to a pH of 9.5 to a pH of 11.8 in a single step, but adjusted to a slightly lower pH, that is, a pH range of 5.5 to 9.5, and preferably a pH of 5.5 to 6.5 such that aluminum is selectively precipitated. At a liquid property of a pH of 5.5 to 9.5, layered double hydroxides are less likely to be produced, while almost all of aluminum in the liquid produces hydroxides and precipitates. Therefore, by adjusting the pH to the above pH, aluminum precipitates can be produced while avoiding an excessive increase in the amount of sludge produced, and aluminum can be removed efficiently by solid-liquid separation. As a neutralizing agent, calcium hydroxide, calcium oxide, sodium hydroxide, potassium hydroxide, and the like can be used.

In the step, when a calcium compound is used as the neutralizing agent, the calcium compound reacts with the fluorine in the second treated water to produce calcium fluoride ($CaF_2$) and form a fluorine compound. Accordingly, fluorine can be efficiently removed from the liquid along with aluminum. In addition, the produced calcium fluoride has good filterability and can significantly improve solid-liquid separation properties. Sodium fluoride or potassium fluoride produced when sodium hydroxide or potassium hydroxide is used as the neutralizing agent is easily dissolved. However, since fluoride ions in the liquid are adsorbed onto aluminum hydroxide precipitates, fluorine can be removed from the liquid along with aluminum. The primary components of these precipitates recovered by solid-liquid separation into the third treated water and the precipitates containing aluminum and fluorine are aluminum and fluorine, and thus can be used as an aluminum resource or a fluorine resource.

In the aluminum and fluorine removal step, in order to suppress coprecipitation of arsenic and zinc remaining in the second treated water and selectively precipitate aluminum and fluorine, the pH is preferably adjusted to be in a range of 5.5 to 7.0. For example, fluorine in the liquid reacts with calcium hydroxide to produce calcium fluoride precipitates, the concentration of fluorine in the liquid sharply decreases in a pH range of 4.0 to 5.5, and the concentration becomes almost zero near a pH of 7. On the other hand, arsenic and zinc in the liquid are adsorbed onto the calcium fluoride precipitates in a pH range of 4.0 to 7.0 and the concentration thereof in the liquid gradually decreases. However, if the pH exceeds 7.0 and enters an alkaline range, a part thereof starts to form hydroxides or calcium salts, and the rates of decrease in the zinc concentration and the arsenic concentration in the liquid gradually increase. Therefore, in order to suppress the production of precipitates of zinc or arsenic and promote the precipitation of aluminum and fluorine, it is preferable to control the pH to be in a range of 5.5 to 7.0. Precipitates of aluminum and fluorine produced in this pH range contain less zinc and arsenic mixed therein, and thus can be used as an aluminum resource and a fluorine resource, for example, firing raw materials for cement.

[Neutralization Step]

After removing aluminum and fluorine, an alkali is further added to the third treated water to adjust the pH to be in a range of 9.5 to 11.8 and produce neutralized precipitates of heavy metal hydroxides, and these are removed by solid-liquid separation. When the pH exceeds 11.8, zinc hydroxide is re-dissolved, which is not preferable. By adjusting the pH to be in a range of 9.5 to 11.8, heavy metals such as zinc, cadmium, and nickel remaining in the liquid produce hydroxides and precipitate. Therefore, solid-liquid separation into an alkali neutralization treated water and the neutralized precipitates of heavy metal hydroxide is performed for removal.

By the above series of treatment steps, gypsum with a small amount of fluorine and heavy metals is recovered, and the amount of fluorine and heavy metals in the wastewater is reduced until the wastewater regulations are met, so that discharge to the outside of the system can be achieved. In addition, since the liquid property of the alkali neutralization treated water in the neutralized precipitate removal step is a pH of 9.5 to 11.8, to discharge the water, an acid may be added for neutralization to comply with a pH of 5.8 or more and 8.6 or less, which is the effluent standard value. The recovered gypsum and precipitates can be used as cement raw materials.

In the treatment method of the present embodiment, by dissolving aluminum in wastewater, the stable dissolution of fluorine and the production of heavy metal precipitates proceed simultaneously, so that the treatment can be carried out efficiently. In addition, since gypsum is produced in a state where fluorine is stably dissolved in the liquid, fluorine is not mixed in the gypsum, and gypsum having an extremely small amount of fluorine can be obtained. Also, it is not necessary to wash the gypsum with a large amount of chemicals such as sulfuric acid. Therefore, the amount of water discharged can be reduced. Furthermore, in the treatment method of the present embodiment, a sulfidizing agent is not used, so that hydrogen sulfide is not produced and the working environment is safe.

In the treatment method of the present embodiment, after the gypsum is recovered, the liquid property is not adjusted to a pH of 9.5 to a pH of 11.8 in a single step for the production of hydroxides, but adjusted to a slightly lower pH, that is, a pH range of 5.5 to 9.5 for selective precipitation of aluminum, so that layered double hydroxides and the like are not produced and the amount of sludge produced is not increased. Therefore, the burden of sludge treatment is significantly reduced. Specifically, it is possible to avoid an increase in the amount of fuel used in a sludge smelting treatment, and it is possible to extend the life of a final disposal site by suppressing the amount of landfill in landfill disposal.

EXAMPLES

Hereinafter, examples of the present invention will be described together with comparative examples. The concentration was measured based on JIS K 0102:2013 Testing methods for industrial wastewater.

Example 1

A metal aluminum foil (manufactured by Mitsubishi Aluminum Co., Ltd., purity 99.5% or more, thickness 20 μm, width 2 mm, and length 4 mm) was added to 1 L of a waste liquid (fluorine concentration 2.9 g/L, arsenic concentration 6.2 g/L, copper concentration 1.5 g/L, pH 1.1) from a copper smelter, the resultant was stirred for 30 minutes, and the produced precipitates were subjected to solid-liquid separation.

Calcium carbonate was added to the filtrate to produce gypsum, and the amounts of fluorine, arsenic, and copper contained in the gypsum recovered by solid-liquid separation were measured. Tables 1 to 3 show results obtained by changing the addition amount (Al/F molar ratio) of aluminum with respect to the amount of fluorine contained in the waste liquid, and pH.

As shown in Tables 1 to 3, when the Al/F molar ratio is 0.3, the fluorine content in the gypsum is 0.3 mass % or more, and the gypsum has a large fluorine content. On the other hand, when the Al/F molar ratio is 0.4, the amount of fluorine in the gypsum is 0.2 mass % or less, and the fluorine content is greatly reduced. However, when the pH is 4.1 or more, the amount of arsenic mixed in the gypsum rapidly increases. Therefore, the dissolution of aluminum is performed preferably at an Al/F molar ratio of 0.4 or more and a pH of 4 or less. By dissolving aluminum under these conditions, the amount of fluorine mixed in the gypsum can be reduced, and furthermore, heavy metals contained in the waste liquid do not precipitate as hydroxides or coprecipitate with the gypsum. Therefore, gypsum containing almost no arsenic and copper can be obtained.

TABLE 1

| Addition amount of Al | Al/F = 0.3 mol | | | | | | |
|---|---|---|---|---|---|---|---|
| pH | 1.1 | 1.2 | 1.3 | 1.4 | 1.5 | 1.6 | 2.1 |
| F [mass %] | 0.38 | 0.38 | 0.35 | 0.35 | 0.43 | 0.40 | 0.45 |
| As [mass %] | 0.00 | 0.00 | 0.00 | 0.00 | 0.00 | 0.00 | 0.01 |
| Cu [mass %] | 0.00 | 0.00 | 0.00 | 0.00 | 0.00 | 0.00 | 0.00 |

TABLE 2

| Addition amount of Al | Al/F = 0.4 mol | | | | | | |
|---|---|---|---|---|---|---|---|
| pH | 1.1 | 1.2 | 1.3 | 1.4 | 1.9 | 2.3 | 2.9 | 3.4 |
| F [mass %] | 0.20 | 0.20 | 0.20 | 0.20 | 0.19 | 0.16 | 0.18 | 0.16 |
| As [mass %] | 0.00 | 0.00 | 0.00 | 0.00 | 0.01 | 0.02 | 0.04 | 0.04 |
| Cu [mass %] | 0.00 | 0.00 | 0.00 | 0.00 | 0.00 | 0.00 | 0.00 | 0.00 |

TABLE 3

| Addition amount of Al | Al/F molar ratio = 0.4 | | | |
|---|---|---|---|---|
| pH | 4.1 | 4.2 | 4.3 | 4.4 |
| F [mass %] | 0.16 | 0.18 | 0.17 | 0.2 |
| As [mass %] | 0.08 | 0.10 | 0.28 | 0.5 |
| Cu [mass %] | 0.00 | 0.00 | 0.00 | 0.00 |

Example 2

To the same waste liquid from a copper smelter as in Example 1, a metal aluminum foil was added under the condition of an Al/F molar ratio of 0.4 to produce precipitates, solid-liquid separation was performed, and calcium carbonate was added to the filtrate to produce gypsum at a pH of 4.0. Calcium hydroxide was sequentially added to the filtrate obtained by solid-liquid separation of the gypsum to produce aluminum precipitates.

Figure 2:
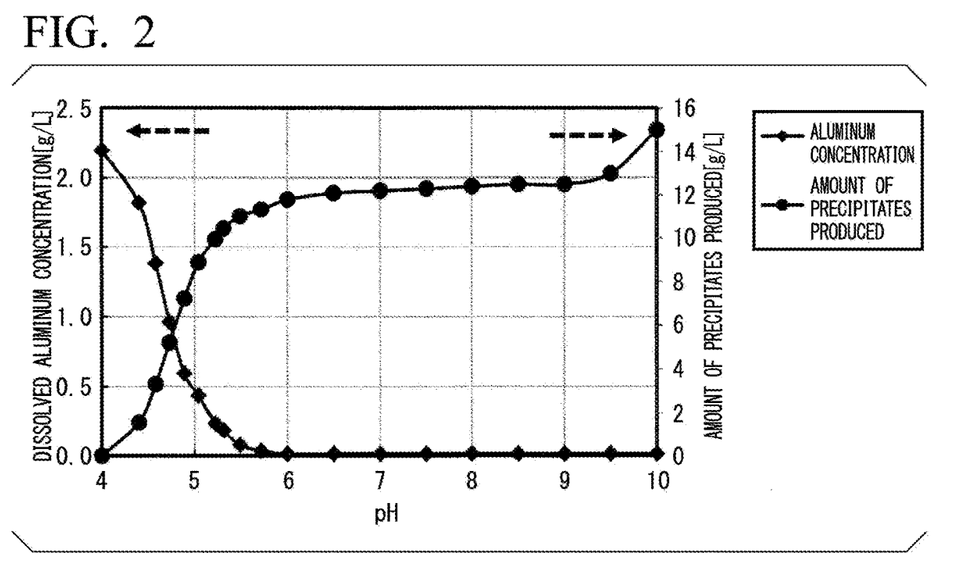
FIG. 2 is a graph showing changes in the amount of precipitates produced and aluminum concentration in Example 2.

FIG. 2 shows the changes in the amount of precipitates produced and the aluminum concentration corresponding to the change in pH with the addition amount of calcium hydroxide. As shown in FIG. 2, it can be confirmed that almost all the amount of aluminum becomes precipitates when the pH is 5.5 or more. On the other hand, the increase in the amount of precipitates produced once peaks until the pH reaches 6.5, and when the pH exceeds 9.5, the amount of precipitates produced rapidly increases again. It is considered that this is caused by an increase in the amount of chlorine, hydroxyl groups, and water of hydration incorporated into the precipitates due to the production of layered double hydroxides. From this result, it is understood that a pH range of 5.5 to 9.5 is suitable and a pH range of 5.5 to 6.5 is preferable in order to reliably precipitate aluminum without increasing the amount of precipitates.

Example 3

Figure 3:
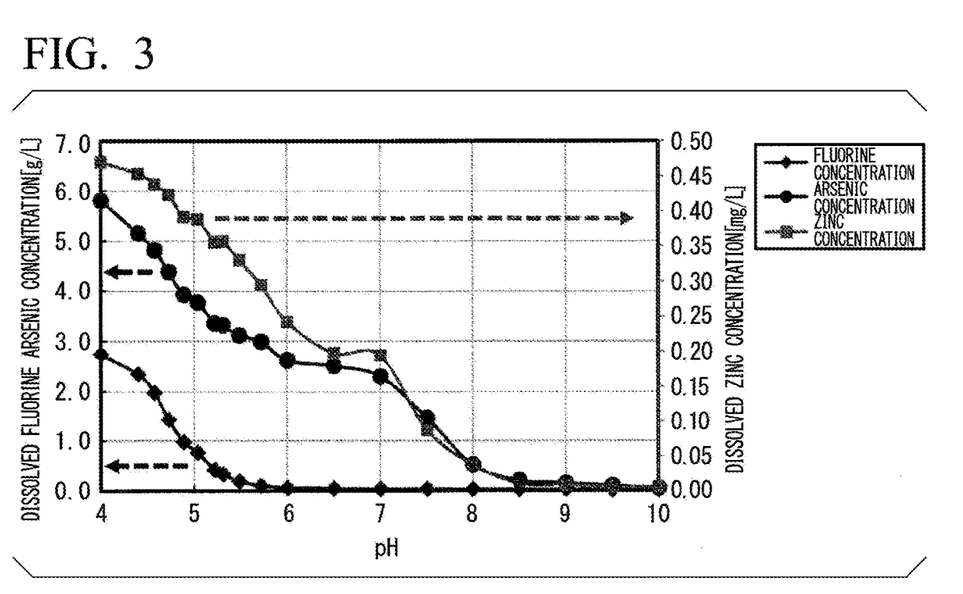
FIG. 3 is a graph showing changes in fluorine concentration, arsenic concentration, and zinc concentration in Example 3.

In the same manner as in Example 2, calcium hydroxide was sequentially added to the residual liquid (pH 4.0) from which the gypsum was separated to produce aluminum precipitates and fluorine precipitates (calcium fluoride). FIG. 3 shows the changes in the residual fluorine concentration and the residual arsenic concentration in the liquid corresponding to the change in pH with the addition amount of calcium hydroxide. As shown in the figure, the concentration of fluorine in the liquid sharply decreases in a pH range of 4.0 to 5.5, decreases to about 0.1 g/L near a pH of 5.5, and becomes almost zero near a pH of 7.

On the other hand, the concentrations of arsenic and zinc in the liquid gradually decreases in a pH range of 4.0 to 7.0, but the rate of decrease in concentration gradually increases when the pH exceeds 7.0 and enters an alkaline range. From this result, it is preferable to control the pH to be in a range of 4.0 to 7.0 in order to produce the fluorine precipitates while avoiding mixing of zinc and arsenic.

Example 4

Using wastewater from a copper smelter, this raw wastewater was heated to 40° C. in a water bath, a cut metal aluminum foil (manufactured by Mitsubishi Aluminum Co., Ltd., purity 99.5% or more, thickness 20 μm, width 2 mm, and length 4 mm) was added to reach a molar ratio of F/Al=0.5 and an Al concentration of 2.0 g/L, and the resultant was stirred for 30 minutes. It was confirmed that after stirring, all the amount of the added metal aluminum was dissolved and reduced black precipitates were precipitated, and this was filtered to obtain a treated water A and reduced precipitates [aluminum dissolution step].

This treated water A was heated to 55° C. in the water bath, calcium carbonate was added thereto, and the resultant was stirred for 2 hours to produce gypsum. The pH after 2 hours was 2.10. The gypsum slurry was filtered to recover the gypsum and a treated water B, and the surface of the gypsum was thoroughly washed with pure water [gypsum recovery step].

The treated water B from which the gypsum was separated was heated to 40° C. in the water bath, calcium hydroxide was added thereto as a pH adjuster, and the resultant was stirred for 1 hour. The pH after 1 hour was 6.00. The slurry containing the produced aluminum precipitates was filtered to recover precipitates containing aluminum and fluorine and a treated water C, and the surface of the precipitates was thoroughly washed with pure water [AlF removal step].

Next, calcium hydroxide as a pH adjuster was added at room temperature to the treated water C from which the aluminum precipitates were separated, and the resultant was stirred for 1 hour to produce neutralized precipitates. The pH after 1 hour was 11.75. The slurry containing the neutralized precipitates was filtered to obtain the neutralized precipitates E and a treated water D [neutralization step].

Table 4 shows the results. As shown in Table 4, fluorine in the recovered gypsum is 0.05 mass %, which is significantly low. In addition, the amount of aluminum and fluorine contained in the treated water C after removal of aluminum and fluorine is significantly small, and aluminum and fluorine can be effectively recovered as precipitates. Furthermore, the amount of heavy metals contained in the treated water D after the neutralization step is equal to or less than the wastewater regulation, and the burden of wastewater treatment is small. In addition, the amount of precipitates (kg-dry/n) includes reduced precipitates 4.9 kg, precipitates of aluminum and fluorine 15.1 kg, and neutralized precipitates 11.6 kg (total 31.6 kg), which is significantly smaller than the amount of precipitates of Comparative Examples 1 and 2.

TABLE 4

|  | F | $SO_4^{2-}$ | As | Cu | Fe | Zn | Cd | Ni | Al |
|---|---|---|---|---|---|---|---|---|---|
| Raw wastewater (g/L) [Al dissolution step] | 2.9 | 73.9 | 9.4 | 1.2 | 0.19 | 0.49 | 0.28 | 0.19 | 0.0023 |
| Treated water A (g/L) | 2.9 | 73.9 | 5.7 | 0.08 | 0.18 | 0.48 | 0.27 | 0.18 | 2.0 |
| Reduced precipitates (Amount of precipitates 4.9 kg) [Gypsum recovery step] | 0.00 | 1.51 | 47.3 | 17.1 | 0.01 | 0.00 | 0.18 | 0.01 | 0.32 |
| Gypsum (mass %) | 0.05 | 59.4 | 0.02 | 0.00 | 0.05 | 0.00 | 0.00 | 0.00 | 0.00 |
| Treated water B (g/L) [AlF removal step] | 2.8 | 3.86 | 5.6 | 0.07 | 0.18 | 0.48 | 0.27 | 0.18 | 2.0 |
| Treated water C (g/L) | 0.071 | 2.91 | 3.5 | 0.0040 | 0.0040 | 0.24 | 0.16 | 0.092 | 0.017 |
| Al•F precipitates (%) (Amount of precipitates 15.1 kg) [Neutralization step] | 19.3 | 4.62 | 11.6 | 0.456 | 1.73 | 1.53 | 0.744 | 0.317 | 17.4 |
| Neutralized precipitates (%) (Amount of precipitates 11.6 kg) | 0.52 | 18.1 | 31.2 | 0.041 | 0.077 | 2.51 | 1.94 | 1.10 | 0.811 |
| Treated water D (g/L) | 0.020 | 1.27 | 0.0043 | 0.000 | 0.000 | 0.003 | 0.000 | 0.000 | 0.000 |

(Note)
Unit of amount of precipitates (dry weight) is kg-dry/m³

Comparative Example 1

Raw wastewater having the same composition as in Example 3 was heated to 55° C. in a water bath, calcium carbonate was added thereto, and the resultant was stirred for 2 hours to produce gypsum. The pH after stirring for 2 hours was 1.81. The slurry containing the gypsum was filtered to recover the gypsum and a treated water B2, and the surface of the gypsum was thoroughly washed with pure water [gypsum recovery step].

Next, calcium hydroxide as a pH adjuster was added to the treated water B2 at room temperature and the resultant was stirred for 1 hour. The pH after 1 hour was 11.81 [neutralization step]. The slurry containing the precipitates produced by this neutralization treatment was filtered to recover the neutralized precipitates (the amount of precipitates 41.6 kg) and a treated water D2. The amount of fluorine contained in the recovered gypsum was 1.52 mass %, which was significantly larger than the amount of fluorine contained in the gypsum recovered in Example 3, and the amount of precipitates was also larger than that in Example 3.

Comparative Example 2

Raw wastewater having the same composition as in Example 3 was heated to 40° C. in a water bath, a cut metal aluminum foil (manufactured by Mitsubishi Aluminum Co., Ltd., purity 99.5% or more, thickness 20 μm, width 2 mm, and length 4 mm) was added to reach a molar ratio of F/Al=0.5 and an Al concentration of 2.0 g/L, and the resultant was stirred for 30 minutes. It was confirmed that after stirring, all the amount of the added metal aluminum was dissolved and reduced black precipitates were precipitated, and this was filtered to obtain a treated water A2 and reduced precipitates [aluminum dissolution step].

This treated water A2 was heated to 55° C. in the water bath, calcium carbonate was added thereto, and the resultant was stirred for 2 hours to produce gypsum. The pH after 2 hours was 2.10. The gypsum slurry was filtered to recover the gypsum and a treated water B2, and the surface of the gypsum was thoroughly washed with pure water [gypsum recovery step].

Next, calcium hydroxide as a pH adjuster was added to the treated water B2 at room temperature, and the resultant was stirred for 1 hour to produce neutralized precipitates. The pH after 1 hour was 11.75. The slurry containing the neutralized precipitates was filtered to obtain the neutralized precipitates and a treated water D2 [neutralization step].

The amount of aluminum contained in the treated water D2 was 0.054 g/L and the amount of fluorine was 0.090 g/L, so that a larger amount of aluminum and fluorine than in Example 3 remained. In addition, the amount of reduced precipitates was 4.9 kg (dry/m³) and the amount of neutralized precipitates was 44.1 kg (dry/m³), so that the total amount of precipitates (49.0 kg) was significantly increased compared to Example 3.

INDUSTRIAL APPLICABILITY

According to the method of treating a waste liquid of the present invention, it is possible to provide a method of treating a waste liquid capable of more effectively removing fluorine and heavy metals contained in the waste liquid while suppressing the mixing of fluorine in gypsum and the production of sludge in the process of treating the waste liquid.

What is claimed is:

1. A method of treating a waste liquid for recovering gypsum having fluorine from an acidic waste liquid containing fluorine and a heavy metal and removing the heavy metal, the method comprising:
- an aluminum dissolution step of dissolving metal aluminum in the acidic waste liquid to stably dissolve fluorine in the liquid as a fluoroaluminate ion and produce a reduced heavy metal precipitate and performing separation into a first treated water and the reduced heavy metal precipitate;
- a gypsum recovery step of, after removing the reduced heavy metal precipitate, adding a calcium compound to the first treated water at a liquid property of a pH of 4 or less to produce gypsum, and performing separation into a second treated water and the gypsum;
- an aluminum and fluorine removal step of, after removing the gypsum, adding an alkali to the second treated water to adjust a pH to 5.5 to 9.5 and produce a precipitate containing aluminum and fluorine, and performing separation into a third treated water and the precipitate containing aluminum and fluorine; and
- a neutralization step of, after removing the precipitate containing aluminum and fluorine, further adding an alkali to the third treated water to adjust the pH to 9.5 to 11.8 and produce a neutralized precipitate of a heavy metal hydroxide, and performing separation into an alkali neutralization treated water and the neutralized precipitate of a heavy metal hydroxide, wherein a reduction reaction occurs by dissolving the metal aluminum in the acidic waste liquid in the aluminum dissolution step, and an oxidation-reduction potential in the reduction reaction is +400 mV or less.

2. The method of treating a waste liquid according to claim 1,
wherein, in the aluminum and fluorine removal step, a liquid property of the second treated water is adjusted to a pH of 5.5 to 7.0 to suppress precipitation of arsenic and zinc, thereby fluorine and aluminum are selectively precipitated.

3. The method of treating a waste liquid according to claim 2,
wherein the acidic waste liquid containing fluorine and a heavy metal is wastewater from a non-ferrous metal smelter.

4. The method of treating a waste liquid according to claim 1,
wherein the acidic waste liquid containing fluorine and a heavy metal is wastewater from a non-ferrous metal smelter.

* * * * *